United States Patent [19]

Steiner

[11] Patent Number: 4,884,716

[45] Date of Patent: Dec. 5, 1989

[54] FUEL CAP WITH TETHERED ANTI-SPLASH ATTACHMENT

[75] Inventor: Ronald O. Steiner, Hilbert, Wis.

[73] Assignee: Tecumseh Products Company, Tecumseh, Mich.

[21] Appl. No.: 304,811

[22] Filed: Jan. 31, 1989

[51] Int. Cl.[4] ............................................. B65D 51/16
[52] U.S. Cl. ................................. 220/202; 220/303; 220/371; 220/DIG. 33
[58] Field of Search ............... 220/371, 374, 303, 202, 220/209, DIG. 33

[56] References Cited

U.S. PATENT DOCUMENTS

| | | | |
|---|---|---|---|
| 2,675,093 | 4/1954 | McCall et al. | 183/45 |
| 3,083,862 | 4/1963 | Bowden | 220/202 |
| 3,451,584 | 6/1969 | Degaetano | 220/371 |
| 3,815,776 | 6/1974 | MacMillan | 220/39 R |
| 3,825,147 | 7/1974 | Noponen et al. | 220/44 A |
| 3,961,724 | 6/1976 | Kapsy | 220/371 |
| 4,168,012 | 9/1979 | Hawkinson | 220/209 |
| 4,512,499 | 4/1985 | Uuskallio | 220/374 |
| 4,696,409 | 9/1987 | Vize | 220/203 |

FOREIGN PATENT DOCUMENTS 2501228 7/1975 Fed. Rep. of Germany ...... 220/209

OTHER PUBLICATIONS

Photograph of Tecumseh filler cap.

*Primary Examiner*—Donald F. Norton
*Attorney, Agent, or Firm*—Albert L. Jeffers; John F. Hoffman

[57] ABSTRACT

A fuel cap has an anti-splash attachment which includes an outer splash-back baffle, an inner foam plug element and a retainer post which supports the outer baffle and inner plug element and tethers them by a releasable snap-on connection to an inner baffle-supporting stem of the fuel cap. The inner plug element when substantially dry is in a contracted state wherein it is smaller in diameter than the inside diameter of the fuel tank filler neck to which the fuel cap is applied. An annular gap is then present between the exterior side surface of the plug element and the interior surface of the filler neck, making it easy to insert and withdraw the fuel cap with the anti-splash attachment thereon into and from the filler neck. However, once the inner plug element becomes wetted and soaked by splashing liquid fuel, it expands to completely fill a cross-sectional region of the filler neck, closing the annular gap and blocking passage of any liquid fuel past the inner plug element while still allowing passage of vapors due to the porous open-cell nature of its material. The anit-splash attachement can be provided as a separate subassembly allowing retrofitting to pre-existing fuel caps or replacement should the inner plug element wear out over time.

26 Claims, 2 Drawing Sheets

FUEL CAP WITH TETHERED ANTI-SPLASH ATTACHMENT

BACKGROUND OF THE INVENTION

The present invention generally relates to fuel caps for use with fuel tanks and, more particularly, is concerned with a fuel cap having an anti-splash attachment.

Small gasoline engine powered machines, such as lawn mowers, garden tillers, snowblowers, electrical generators and the like, have fuel tanks attached to them. For closing the fuel tank, a fuel cap is applied to the open end of a filler neck connected to and extending from the fuel tank. The fuel cap is commonly constructed to prevent escape of liquid fuel from the fuel tank while, at the same time, permitting venting of the tank to the atmosphere.

One prior art fuel cap, so constructed, provides sufficient clearance at the connection between its internal threads and the external threads on the end of the filler neck to define a path therethrough for venting the fuel tank. To impede migration of liquid fuel to the venting path between the threaded connection of the fuel cap to the filler neck, the fuel cap employs an inverted dome-shaped circular gasket, a foam element disposed in a cavity above the gasket leading to the threaded connection, and a conical splash-back baffle disposed below and connected to the gasket. The foam element normally allows passage of vapors and impedes passage of liquid fuel. The foam which has been used in the past is an open-cell polyurethane that expands when it is contacted by fuel.

The construction of this fuel cap is adequate under some conditions to allow venting of the fuel tank to the external atmosphere along the above-described path and to prevent liquid fuel from migrating along the venting path to the external environment. However, under conditions such as where an excessive amount of vibration is encountered in the operation of the machine carrying the fuel tank, the above-described fuel cap construction sometimes fails to prevent splashing of liquid fuel upward into the vent cavity and leakage thereof past the foam block through the venting path to the external environment.

A number of other fuel cap designs are known in the prior patent art. Representative of the prior art are the fuel caps disclosed in U.S. Pat. Nos. 3,961,724 4,168,012; 4,512,499 and 4,696,409. However, none of these other prior fuel caps appear to provide a satisfactory solution to the above-described problem. Consequently, a need exists for improvements which will overcome this problem without introducing a set of new ones in their place.

SUMMARY OF THE INVENTION

The present invention provides an improved fuel cap construction designed to satisfy the aforementioned needs. The fuel cap of the present invention incorporates an anti-splash attachment which substantially eliminates the above-described problem. The anti-splash attachment includes a splash-back baffle and a foam plug supported and tethered by a retainer post which is adapted to make a releasable snap-on connection to a previously existing stem of the fuel cap.

In the normally contracted state of its material, when the material is substantially dry, the open cell polyurethane foam plug is smaller in diameter than the inside diameter of the fuel tank filler neck. Thus, an annular gap is present between the exterior side surface of the plug and the interior surface of the filler neck, making it easy to insert and withdraw the fuel cap with the attachment thereon into and from the filler neck. However, once the material of the plug becomes wetted and soaked by splashing liquid fuel, the foam plug will expand or swell to completely fill a cross-sectional region of the filler neck, closing or narrowing the annular gap and blocking passage of any liquid fuel past it to the gasket.

Advantageously, the anti-splash attachment can be provided as a separate subassembly allowing retrofitting to pre-existing fuel cap designs. Also, as a separate subassembly, it can be replaced by a new attachment should the foam plug wear out over time.

Accordingly, the present invention, in one form thereof, is directed to an anti-splash attachment for a fuel cap which is adapted to be disposed in an end portion of a filler neck of a fuel tank. The anti-splash attachment comprises: an outer splash-back baffle for placement in the filler neck end portion with its peripheral edge spaced inwardly from the interior of the filler neck end portion to define a space through which liquid fuel when splashed in the fuel tank can migrate upwardly past said outer baffle; an inner foam plug element for placement in the filler neck end portion above the outer baffle; and an elongated retainer post for supporting the outer baffle and the inner foam plug element and having means defined on an inner end thereof for tethering the outer baffle and the inner plug element from the interior of the fuel cap and within the interior of the end portion of the filler neck when the fuel cap is applied thereto.

More particularly, the foam plug element may be composed of a material which, when substantially dry, is in a contracted state wherein it is smaller in diameter than the inside diameter of the end portion of the fuel tank filler neck to which the fuel cap is applied such that an annular gap is present between an exterior side surface of the foam plug element and the interior of the filler neck end portion, making it easy to insert and withdraw the fuel cap with the anti-splash attachment thereon into and from the filler neck end portion.

On the other hand, when wetted and soaked by liquid fuel splashing upward through the space and past the peripheral edge of the outer baffle, the material of the foam plug element expands to completely fill a cross-sectional region of the filler neck end portion, closing the annular gap and blocking passage of any liquid fuel past the foam plug element. Due to the porous nature of the foam plug element material, it sill allows passage of vapors.

In accordance with one form of the invention, a fuel cap is provided that is adapted to be removeably disposed in a filler neck of a fuel tank, wherein the cap comprises a cap member having means for removeably attaching the member to the filler neck, vent means associated with the cap member for permitting vapors to escape from the filler neck past the cap member, and a foam plug element attached to an underneath side of the cap member and adapted to be disposed within the filler neck and having a peripheral edge dimensioned smaller than the filler neck to define an annular gap between the plug element and the filler neck. The plug element, when wetted and soaked by liquid fuel splashing against it, expands to substantially fill a cross-sectional region of the filler neck portion, thereby substantially closing the annular gap and blocking passage of any liquid fuel past the plug element.

Also, the means defined on the inner end of the retainer post is an element for releasably connecting the post and thereby releasably tethering the outer baffle and the inner foam plug element to the fuel cap to provide the anti-splash attachment as a separate subassembly allowing replacement thereof.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DETAILED DESCRIPTION OF THE INVENTION

Figure 1:
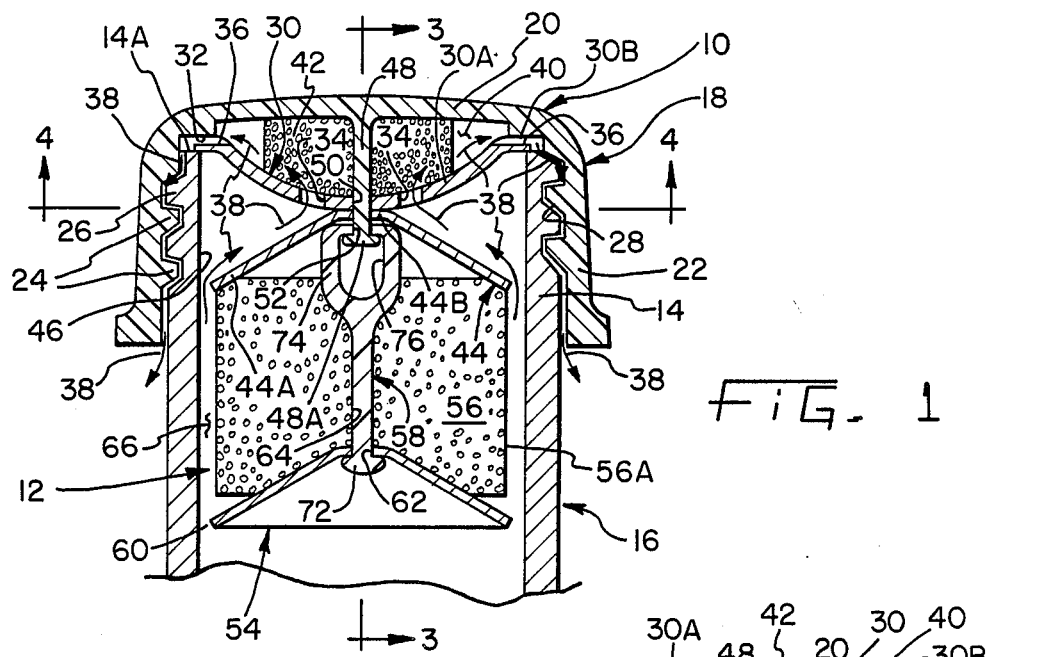
FIG. 1 is a longitudinal axial sectional view of an end portion of a fuel tank filler neck and of a fuel cap employing an anti-splash attachment of the present invention being applied on the filler neck, with a foam plug element of the attachment being shown in a contracted state.

Referring now to the drawings, and particularly to FIGS. 1-4, there is shown a fuel cap, generally designated by the numeral 10, which incorporates an improved anti-splash attachment, generally indicated at 12 and constructed in accordance with the principles of the present invention. The fuel cap 10 can be applied on an end portion 14 of a filler neck 16 of a fuel tank with the anti-splash attachment 12 disposed within the interior of the filler neck end portion 14.

In addition to the improved anti-splash attachment 12, the fuel cap 10 includes a cup-shaped cap body 18 having a circular top wall 20 and an annular side skirt 22 depending from the periphery of the top wall 20. The skirt 22 of the fuel cap 10 has internal threads 24 which receive and interfit with external threads 26 on the end portion 14 of the filler neck 16 such that sufficient clearance is left therebetween to define a passage 28 for venting of the fuel tank (not shown) via the filler neck 16 and the passage 28 to the external atmosphere.

Also, the fuel cap 10 includes a circular gasket 30, such as composed of molded rubber, having a central inverted dome-shaped portion 30A and an annular flat rim portion 30B extending radially outward from and encompassing the periphery of the central portion 30A. The gasket 30 is mounted at its peripheral rim portion 30B to an annular shoulder 32 formed on the cap body 18 on the underside of the top wall 20 at the location of its merger with the side skirt 22. When the fuel cap 10 is threaded on the filler neck 16, the top edge 14A of the neck end portion 14 abuts the bottom of the gasket peripheral rim portion 30B tightly capturing and sealing it between the neck end portion upper edge 14A and the cap top wall annular shoulder 32 and thus precluding escape of liquid fuel from the filler neck 16 between the gasket 30 and neck end portion upper edge 14A.

To provide a path between the interior of the filler neck 16 and the clearance passage 28 created by the threads 24, 26 of the cap body 18 and the filler neck 16, respectively, for venting the fuel tank to the atmosphere, the gasket 30 has a pair of vent orifices 34 through its central portion 30A and a plurality of radial vent grooves 36 defined in the top surface of its rim portion 30B which are spaced circumferentially from one another. Thus, a venting path, as depicted by the arrows 38 in FIG. 1, extends through the clearance passage 28 between the threads 24, 26 on the neck upper end portion 14 and the skirt 22 of the fuel cap body 18, through the vent grooves 36 in the gasket rim portion 30B, through a cavity 40 formed between the top wall 20 of the fuel cap body 18 and the central portion 30A of the gasket 30, and finally through the gasket central portion orifices 34 downward through the filler neck 16 to the fuel tank (not shown).

To prevent liquid fuel in the fuel tank from splashing upwardly through the gasket vent orifices 34 and therefrom through the gasket peripheral vent grooves 36, the fuel cap 10 further includes a foam element 42 disposed in the cavity 40 defined between the fuel cap body top wall 20 and the gasket central portion 30A and a splash-back baffle 44 of frusto-conical shape connected to the center of the gasket 30 and extending across but spaced by a narrow annular space or gap 46 at its periphery from the fuel tank neck 16. The inner baffle 44 has an outwardly flared conical portion 44A closed at its upper end by a circular planar upper portion 44B. An elongated stem 48 is integrally connected to the interior side of the fuel cap body top wall 20 at the center thereof. The stem 48 depends from the top wall 20 and extends axially through the interior of the fuel cap body 18 and through a central hole 50 in the gasket central portion 30A and a central opening 52 in the upper planar portion 44B of the inner splash-back baffle 44. At the lower end of the stem 48, a flattened head 48A of a circular configuration is formed thereon (by a melting process after the inner baffle 44 is installed) which is larger in diameter than the opening 52 in the inner baffle 44 for retaining the baffle upper central portion 44B against the bottom side of the gasket 30 about the central hole 50 therein.

The above-described construction of the fuel cap 10, which is substantially identical with the one prior art fuel cap briefly mentioned earlier, is adequate under many conditions to allow venting of the fuel tank to the external atmosphere along the above-described path 38 (which also extends through the gap 46 between the filler neck 16 and the periphery of the inner baffle) while preventing liquid fuel from migrating sufficiently far along the venting path 38 to reach the cavity 40 and vent grooves 36. However, under conditions where an excessive amount of vibration or tilting is encountered in the operation of a machine carrying the fuel tank with the fuel cap 10 applied thereto, the above-described fuel cap construction sometimes fails to prevent splashing of liquid fuel upward into the vent cavity 40 and leakage therefrom along the venting path 38 through the vent grooves 36 and between the threads 24, 26 to the external environment.

The improved anti-splash attachment 12 of the present invention incorporated by the fuel cap 10 substantially eliminates the above-described problem. In its basic components, the anti-splash attachment 12 includes an outer splash-back baffle 54, a foam plug element 56 and an elongated retainer post 58. When the anti-splash attachment 12 is mounted to the fuel cap body 18 and the fuel cap 10 is applied to the filler neck end portion 14, the outer baffle 54 is located in the filler neck end portion 14 in spaced relation below the inner baffle 44 and the foam plug element 56 is located in a lightly clamped state in the filler neck end portion 14 between the inner and outer baffles 44, 54.

The outer baffle 54 at its periphery is spaced inwardly from the interior of the filler neck end portion 14 to define an annular space or gap 60 axially spaced from the space or gap 46 at the periphery of the inner baffle 44 and through which liquid fuel when splashed in the fuel tank can migrate upwardly past the outer baffle 54. The outer baffle 54 has a central opening 62 and the plug element 56 has a central passage 64. Preferably, the foam plug element 56 is composed of an open-cell polyurethane material and has a generally cylindrical shape. In one example, the plug element material is T-50 reticulated open pore flexible polyurethane. The baffles 44, 54 are preferably composed of a metal material, such as aluminum, or plastic. In one example, aluminum 1100-H14 is used. The other parts are composed of a suitable plastic material.

Due to its open-cell, flexible nature, the foam plug element 56 is capable of expanding or swelling and thus growing in diameter when wetted and soaked with liquid fuel. In the normally contracted state when the material is substantially dry, foam plug element 58 is smaller at its outside diameter than the inside diameter of the end portion 14 of the filler neck 16. Thus, an annular passage or gap 66, which communicates between gaps 46, 60 at the respective peripheries of the inner and outer baffles 44, 54, is present between the exterior side surface 56A of the plug element 56 and the interior surface of the filler neck end portion 14. The smaller outside diameter size of the plug element 56 in its dry state makes it easy to insert and withdraw the fuel cap 10 with the attachment 12 thereon into and from the filler neck 16. By way of example, the plug element 56 can have a diameter of 1.3 inches with the annular gap 66 between its outside surface 56A and the interior of the filler neck 16 about 0.060 inch. The plug element can grow or expand approximately 0.110 to 0.120 inch when soaked with leaded gasoline and somewhat more when soaked with lead-free gasoline.

Thus, once the material of the plug element 56 becomes wetted and soaked by liquid fuel splashing upward through the outer baffle annular gap 60 and past the periphery of the outer baffle 54, the foam plug element 56 will expand or swell to completely fill a cross-sectional region of the filler neck end portion 14 coextensive in length with the plug element 56 in the filler neck end portion. Such expansion of the plug element 56 closes the annular gap 66 and blocks passage of any liquid fuel past it to the gasket 30. However, passage of vapors through the plug element 56 is still allowed due to the porous open-cell nature of its material.

Figure 2:
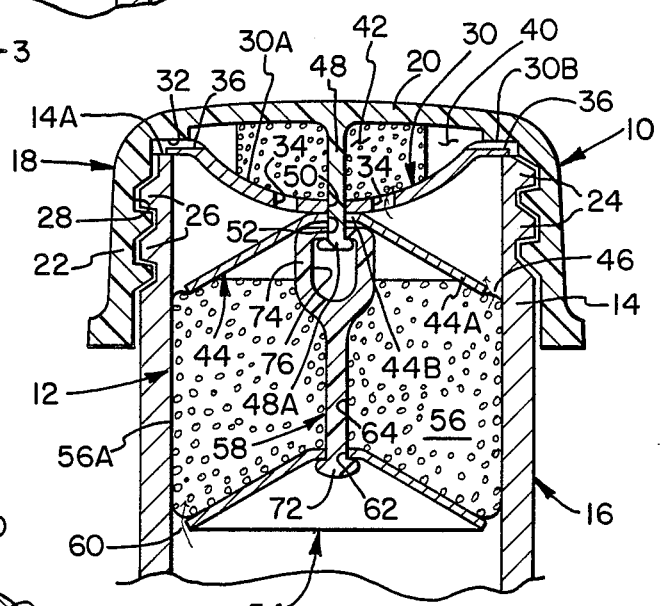
FIG. 2 is a view similar to that of FIG. 1, except that the foam plug element is shown in an expanded state.
Figure 3:
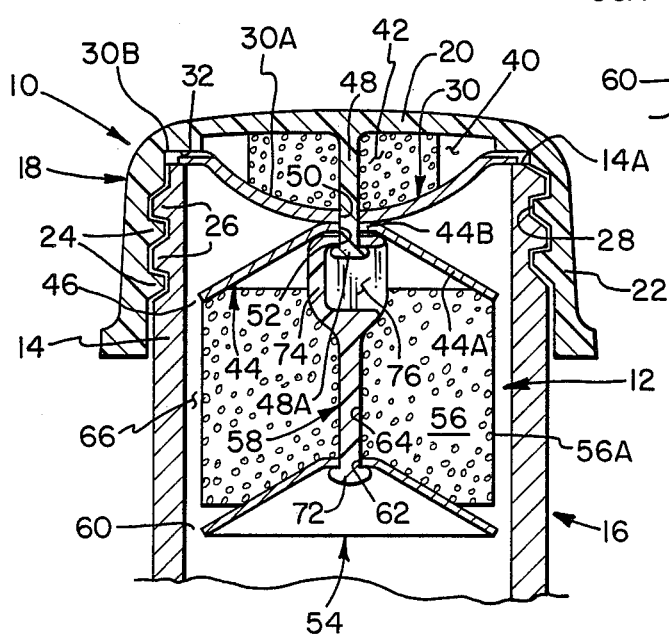
FIG. 3 is a longitudinal axial sectional view taken along line 3—3 of FIG. 1.
Figure 4:
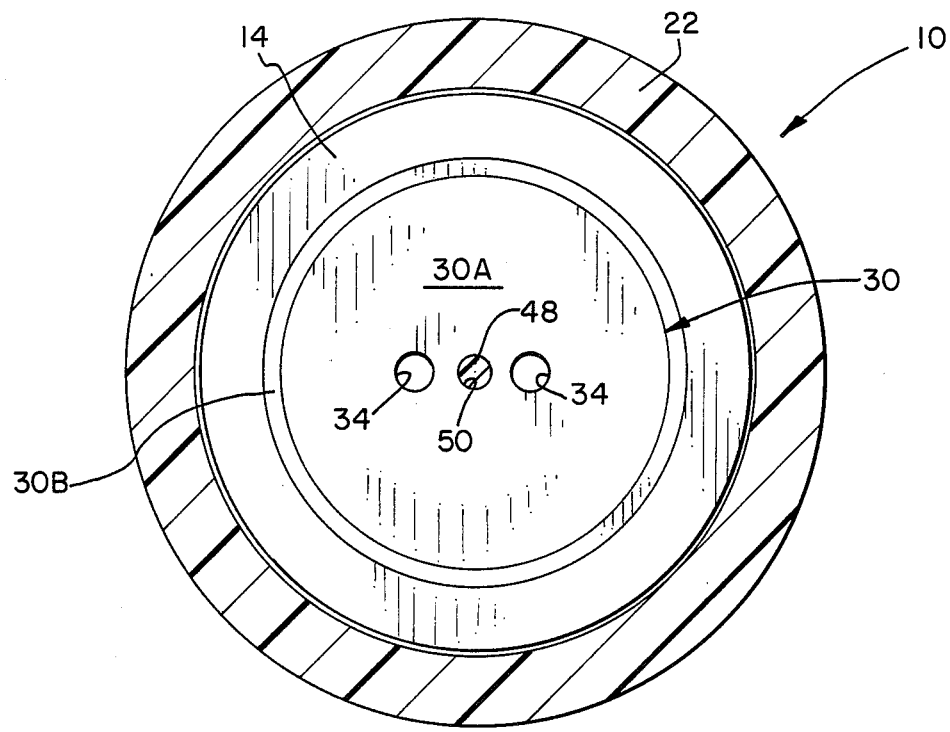
FIG. 4 is an enlarged cross-sectional view taken along line 4—4 of FIG. 3.
Figure 5:
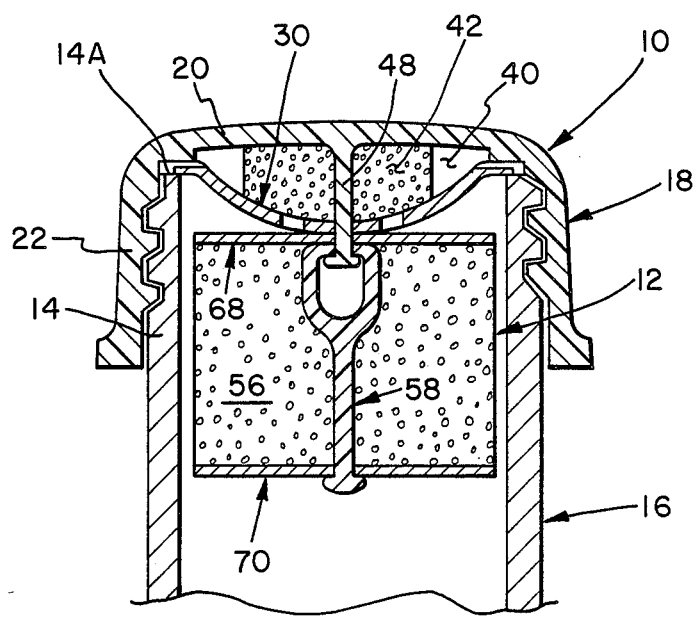
FIG. 5 is a view similar to that of FIG. 1, but showing a modified form of the anti-splash attachment.

In the preferred embodiment of FIGS. 1-3, the inner and outer baffles 44, 54 have generally identical conical shapes in axial cross-section. Alternatively, as seen in FIG. 5, the inner and outer baffles 68, 70 can have identical generally planar shapes. However, the conical shapes of the baffles 44, 54, in which the baffles make much less surface contact with the foam plug element 56 than in their planar shapes, allows the plug element to expand more freely than does the planar shapes.

The retainer post 58 of the anti-splash attachment 12 extends through the central opening 62 and passage 64 of the outer baffle 54 and plug element 56 respectively and has a retainer element 72 defined on its outer end for supporting the outer baffle 54 and the plug element 56 thereon about the retainer post 58 and above its retainer element 72. The retainer element 72 is a flattened head formed in a manner the same as that used to form the flattened head 48A on the lower end of the stem 48.

The retainer post 58 also has a connector element 74 defined at its inner end. The connector element 74 is preferably of a snap-on type and has a grooved recess 76 for connecting the inner end of the retainer post 58 to the enlarged flattened head 48A which forms a complementary connector element on the stem 48. In such manner, the outer baffle 54 and the plug element 56 carried and supported on the retainer post 58 are tethered from the stem 48. The snap-on connection between the retainer post connector element 74 and stem flattened head 48A are releasable so that the retainer post 58, and the outer baffle 54 and plug element 56 supported thereon, are releasably tethered to the stem to provide the anti-splash attachment 12 as a separate subassembly.

Thus, advantageously, the anti-splash attachment 12 can be provided as a separate subassembly allowing retrofitting to preexisting fuel caps. Also, as a separate subassembly, it can be replaced by a new anti-splash attachment should the foam plug element 56 wear out over time.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A fuel cap which is adapted to be applied to an end portion of a filler neck of a fuel tank, said fuel cap comprising:

an outer splash-back baffle for placement in the filler neck end portion with its peripheral edge spaced inwardly from the interior of the filler neck end portion to define an annular space through which liquid fuel when splashed in the fuel tank can migrate upwardly past said outer baffle;

a gas-permeable inner foam plug element for placement in the filler neck end portion above said outer baffle; and means for supporting said outer baffle and said inner plug element and for tethering said outer baffle and said inner plug element from the interior of the fuel cap and within the interior of the end portion of the filler neck when the fuel cap is applied thereto.

2. The fuel cap as recited in claim 1, wherein said inner plug element is composed of a material which, when substantially dry, is in a contracted state wherein it is smaller in diameter than the inside diameter of the end portion of the fuel tank filler neck to which the fuel cap is applied such that an annular gap is present between an exterior side surface of said inner plug element and the interior of said filler neck end portion, making it easy to insert and withdraw the fuel cap with said anti-splash attachment thereon into and from the filler neck end portion.

3. The fuel cap as recited in claim 2, wherein said material composing said inner plug element comprises means, when wetted and soaked by liquid fuel splashing upward through said space and past said peripheral edge of said outer baffle, that expands to substantially fill a cross-sectional region of the filler neck end portion, closing said annular gap and blocking passage of any liquid fuel past said inner plug element.

4. The fuel cap as recited in claim 3, wherein said material composing said inner plug element is of a porous nature which allows passage of vapors.

5. The fuel cap as recited in claim 1, wherein said supporting and tethering means is a retainer post having defined on an inner end an element for releasably connecting said post and thereby releasably tethering said outer baffle and said inner plug element to the interior of the fuel cap to provide said anti-splash attachment as a separate subassembly allowing replacement thereof.

6. The fuel cap as recited in claim 5, wherein said element is a snap-on connector.

7. The fuel cap as recited in claim 1, wherein said outer baffle has a central opening and said inner plug element has a central passage through which extends said retainer post.

8. The fuel cap as recited in claim 1, wherein said outer bafffle has a generally conical shape in axial cross-section.

9. The fuel cap as recited in claim 1, wherein said outer baffle has a generally planar shape.

10. The fuel cap as recited in claim 1, wherein said inner plug element is composed of an open-cell polyurethane foam material.

11. The fuel cap as recited in claim 1, wherein said inner plug element has a generally cylindrical shape.

12. In a fuel cap having a cup-shaped body removeably attached to an end portion of a filler neck of a fuel tank, said fuel cap also having a central stem attached at one end to the interior of said body and extending axially therethrough to an opposite end having a connector element defined thereon, and an inner baffle supported by said stem and having a peripheral edge spaced inwardly from the interior of the filler neck end portion to define an inner annular space through which liquid fuel when splashed in the fuel tank can migrate upwardly past said inner baffle, an anti-splash attachment comprising:
  an outer splash-back baffle located in the filler neck end portion in spaced relation below said inner baffle, said outer baffle having a peripheral edge spaced inwardly from the interior of the filler neck end portion to define an outer annular space axially spaced from said inner annular space and through which liquid fuel when splashed in the fuel tank can migrate upwardly past said outer baffle;
  a gas permeable foam plug element located in the filler neck end portion between said inner and outer baffles; and
  a retainer post supporting said outer baffle and said plug element and having defined on an inner end a complementary connector element for connecting said post to said connector element on said stem and thereby tethering said outer baffle and said plug element from said stem.

13. The fuel cap and filler neck combination as recited in claim 12, wherein said plug element is composed of a material which, when substantially dry, is in a contracted state wherein it is smaller in diameter than the inside diameter of the end portion of the fuel tank filler neck to which the fuel cap is applied such that an annular gap, which communicates with said inner and outer annular spaces about said inner and outer baffles, is present between an exterior said surface of said plug element and the interior of said filler neck end portion, making it easy to insert and withdraw the fuel cap with said anti-splash attachment thereon into and from the filler neck end portion.

14. The fuel cap and filler neck combination as recited in claim 13, wherein said material composing said plug element comprises means, when wetted and soaked by liquid fuel splashing upward through said space and past said peripheral edge of said outer baffle, that expands to substantially fill a cross-sectional region of the filler neck end portion, closing said annular gap and blocking passage of any liquid fuel past said plug element.

15. The fuel cap and filler neck combination as recited in claim 14, wherein said material composing said plug element is of a porous nature which allows passage of vapors.

16. The fuel cap and filler neck combination as recited in claim 12, wherein said complementary connector element on said inner end of said retainer post is adapted for releasably connecting said post and thereby releasably tethering said outer baffle and said plug element to said stem to provide said anti-splash attachment as a separate subassembly allowing replacement thereof.

17. The fuel cap and filler neck combination as recited in claim 16, wherein said complementary connector element is a snap-on connector.

18. The fuel cap and filler neck combination as recited in claim 12, wherein said outer baffle has a central opening and said plug element has a central passage through which extends said retainer post.

19. The fuel cap and filler neck combination as recited in claim 12, wherein said outer baffle has a generally conical shape in axial cross-section.

20. The fuel cap and filler neck combination as recited in claim 12, wherein said outer baffle has a generally planar shape.

21. The fuel cap and filler neck combination as recited in claim 12, wherein said inner plug element is composed of an open-cell polyurethane material.

22. The fuel cap and filler neck combination as recited in claim 12, wherein said inner plug element has a generally cylindrical shape.

23. A fuel cap that is adapted to be removeably attached to a filler neck of a fuel tank comprising:
  a cap member having means for removeably attaching the cap member to the filler neck,
  vent means associated with the cap member for permitting vapors to escape from the filler neck past the cap member, and
  gas permeable foam plug element means attached to an underneath side of said cap member and adapted to be disposed within the filler neck and having a peripheral edge dimensioned smaller than the filler neck to define an annular gap between said plug element means and the filler neck, said plug element means, when wetted and soaked by liquid fuel splashing against it, expands to substantially fill a cross-sectional region of the filler neck, thereby substantially closing the annular gap and blocking passage of any liquid fuel past said plug element means.

24. The fuel cap of claim 23 including a splash-back baffle on an end of said plug element opposite said cap member.

25. The fuel cap of claim 23 wherein said plug element means is composed of a gas permeable, open cell foam material.

26. The fuel cap of claim 23 wherein said cap is threaddedly attached to a fuel tank filler neck and said plug element means is disposed within the filler neck.

* * * * *